United States Patent [19]

Hopper

[11] 4,131,111
[45] Dec. 26, 1978

[54] SOLAR ENERGY COLLECTOR

[75] Inventor: Thomas P. Hopper, Durham, Conn.

[73] Assignee: Sunworks, Inc., Guilford, Conn.

[21] Appl. No.: 772,972

[22] Filed: Feb. 28, 1977

[51] Int. Cl.² .............................................. F24J 3/02
[52] U.S. Cl. ..................................... 126/271; 126/270
[58] Field of Search ............... 126/270, 271; 237/1 A; 52/63, 222; 160/392, 395, 381; D25/74

[56] References Cited

U.S. PATENT DOCUMENTS

| | | | |
|---|---|---|---|
| 2,432,889 | 12/1947 | Herrmann | 160/392 X |
| 2,877,515 | 3/1959 | Haas | D25/74 |
| 3,885,335 | 5/1975 | Egermayer | 160/397 X |
| 3,918,430 | 11/1975 | Stout et al. | 237/1 A X |
| 3,980,071 | 9/1976 | Barber, Jr. | 126/271 |
| 3,991,806 | 11/1976 | Abell | 160/392 X |
| 4,048,981 | 9/1977 | Hobbs | 237/1 A |

*Primary Examiner*—William F. O'Dea
*Assistant Examiner*—Larry Jones
*Attorney, Agent, or Firm*—DeLio and Montgomery

[57] ABSTRACT

A solar energy collector in which one or more sheets of thin transparent material are positioned in the collector housing. The sheets are tensioned on frames which are supported within the housing and the uppermost frame supports a glass cover member.

7 Claims, 5 Drawing Figures

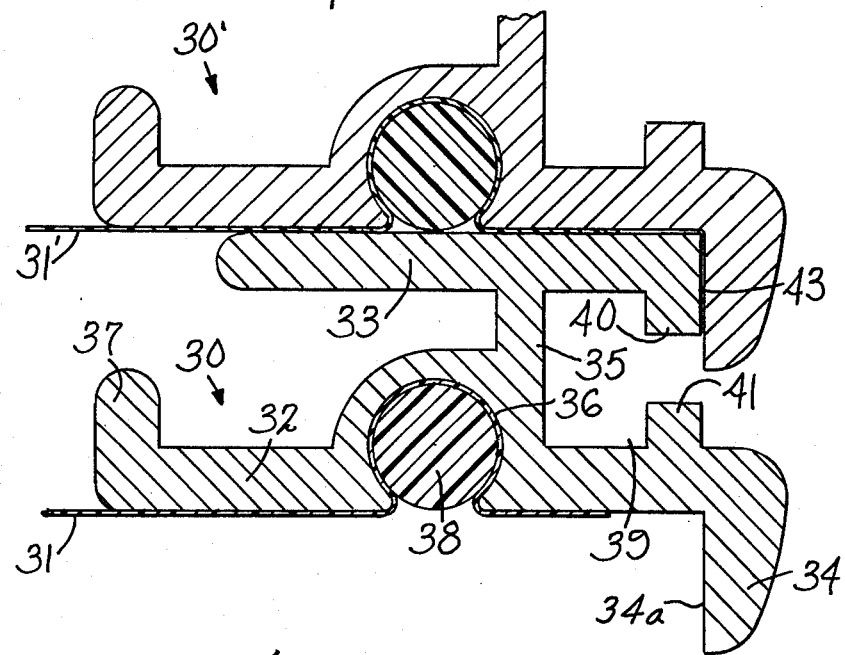
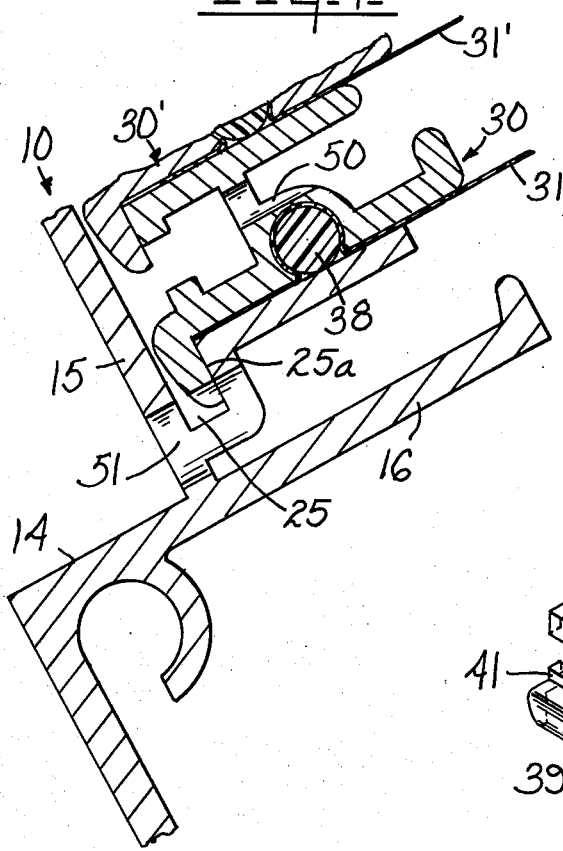
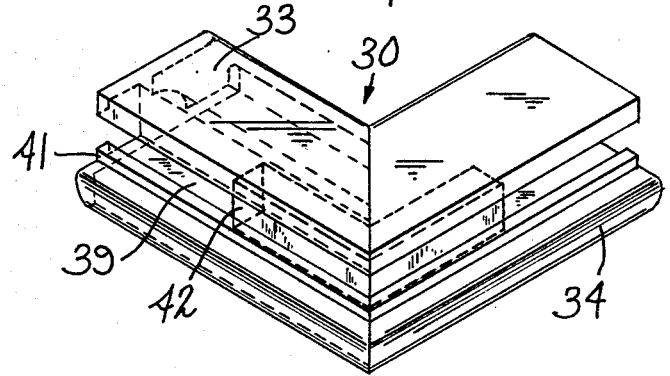

SOLAR ENERGY COLLECTOR

SPECIFICATION

This invention relates to solar energy collectors and more particularly relates to an improved structure of such collectors for reducing losses due to convection currents within the collector housing.

Most solar energy heating systems utilize a collector in the form of a rectangular housing or module having a solar energy absorbing panel. A heat transfer medium, such as a fluid, is moved in heat transfer relation with respect to the absorber. The transfer medium may be utilized for heating directly or it may pass through a heat exchanger after which the transfer of energy is then used for heating or other purposes.

Most collectors comprise a housing including a transparent cover member of glass spaced above and substantially parallel to an absorber. The absorber is generally a panel situated within the collector housing intermediate the cover and the back. The collector is usually installed on a sloping roof or otherwise facing at an angle to the vertical dependent on the latitude of the collector's installation to the sun. This serves to present the maximum absorber surface area orthogonal to the sun's rays.

The absorber is ordinarily at a much higher temperature than the transparent cover. This causes convection currents to form in the space therebetween. Because the absorber panel is at the higher temperature and because of the angular disposition thereof, the air adjacent the panel is heated and tends to rise whereas the air adjacent the transparent cover being cooler and more dense tends to fall. A continuous convection current is then established with heated air moving up and around and into contact with the cooler transparent cover to which it gives up its absorbed heat while the cooler air flows across the absorber and takes heat therefrom.

A continuous removal of thermal energy from the absorber by the convection currents serves to reduce the thermal efficiency of the collector, thereby requiring an increased absorber area to yield a predetermined quantity of heat energy.

The larger temperature difference between the absorber and the panel provides a tremendous convective driving force. One technique of combatting this has been to provide double or triple glazed glass for insulating purposes between the interior of the collector and the outer glass. However, this arrangement adds substantial weight to the collector, additional cost, and also decreases the transmission of light through the plural layers of glass to the absorber.

It has further been suggested to provide one or more layers of the thin transparent sheet or web material below the cover member. Preferably, this may be a layer of polytetrafluoroethylene which has a high transmittance of light as compared to a glass panel. However, the structures thus far described are rather complex in the manner in which the ends of the web material are secured to the housing, and further make no provision for easy access to the interior of the collector, nor do they facilitate assembly of the collector.

Accordingly, the present invention provides a new and improved structure for permitting the installation of one or a plurality of thin, transparent layers of sheet material within a collector housing over the absorber to minimize thermal losses due to convection currents within the housing.

Briefly stated, the invention in one form thereof comprises the provision of a collector housing having an inwardly directed support ledge upon which may be stacked one or more frame members carrying a thin sheet of highly transparent material. The frame members are so formed that the uppermost one provides a support ledge for the glass cover member.

An object of this invention is to provide a new and improved apparatus for minimizing losses due to convection currents within a solar collector housing.

A further object of this invention is to provide a new and improved frame member which supports a thin transparent membrane which may be readily positioned in and removed from a collector housing.

Another object of this invention is to provide a frame member of the type described wherein a plurality of such frame members may be stacked within a collector housing to provide a plurality of the transparent webs between the rigid cover member and the absorber.

The features of the invention which are believed to be novel are particularly pointed out and distinctly claimed in the concluding portion of this specification.

The invention, however, both as to its organization and operation together with further objects and advantages thereof may best be appreciated by reference to the following detailed description taken in conjunction with the drawings, wherein:

FIG. 2 is an isometric view of a corner of a frame utilized in the collector of FIG. 1;

FIG. 3 is an enlarged sectional view of frame members utilized in FIG. 1;

FIG. 4 is a view in section of a portion of the lower end of an installed collector on a sloping structure.

Figure 1:
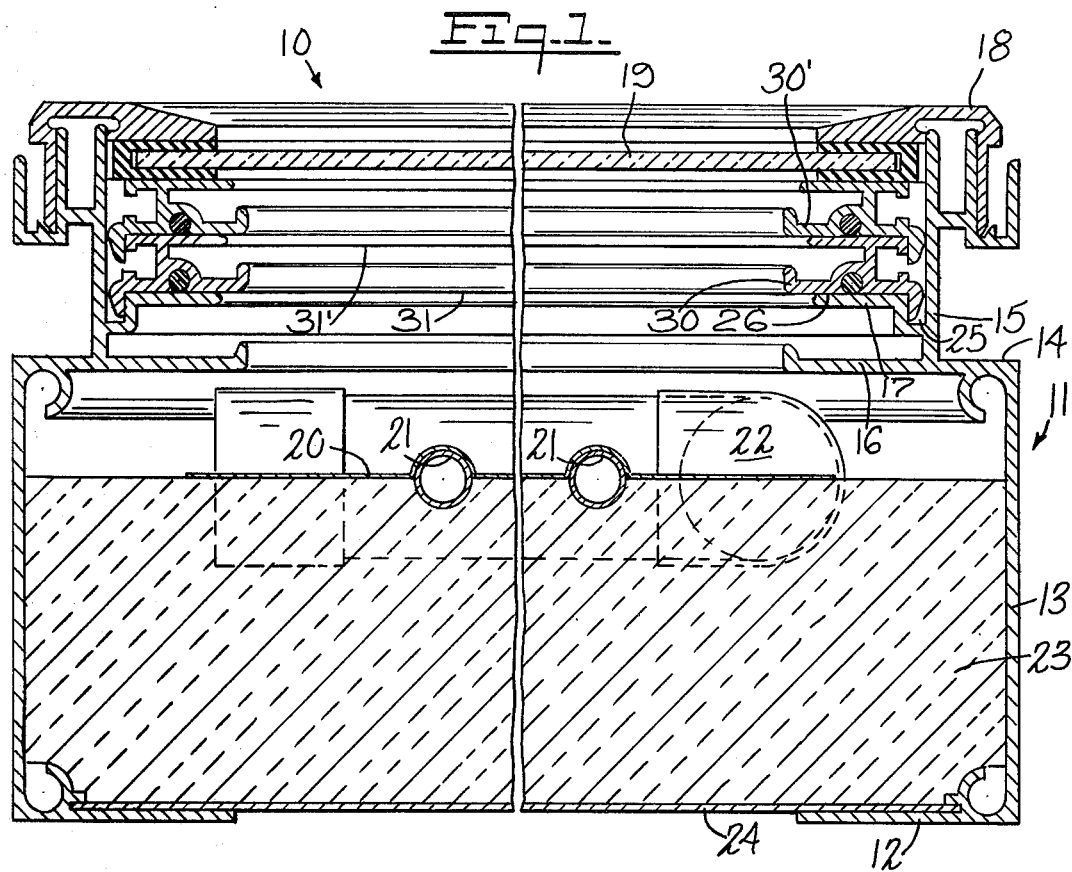
FIG. 1 is a sectional view of a solar energy collector embodying the invention.

A collector housing embodying the invention comprises a housing 10 defined by side wall members 11, which may be of the type disclosed in co-pending application Serial No. 772,971 (DeLio and Montgomery Docket No. 9576). The side wall members are the same, and comprise, a foot portion 12, a first upright wall 13 extending to a shoulder 14, a second upright wall portion 15, a condensation collecting gutter 16, a support ledge 17, and a cap member 18 which retains a transparent cover member 19, such as a glass plate.

Within housing 11 is an absorber panel 20 in intimate heat exchange relation with a plurality of conduits 21. Conduits 21 are connected between upper and lower headers 22 (only one shown). The absorber assembly rests on a thickness of insulation 23 on bottom wall 24. A heat exchange medium in conduits 21 transfers heat from absorber 20 to a storage or utilization point.

Support ledge 17 is defined with a well or channel 25 adjacent wall 15 and a planar upper support surface 26.

Supported on ledge 17 is one or more rectangular frame members 30 and 30' having thin transparent membranes 31 and 31', respectively, extending thereacross and over the absorber. The web may be a thin sheet of polytetrafluoroethylene, more commonly known by the trademark "Teflon". The frames 30 are defined by lengths of stock having a section as shown in FIG. 3.

A frame section, as shown in FIG. 3, comprises a lower seat portion 32 and an upper support portion 33. An outer locating flange 34 depends from seat portion 32. An upstanding leg or web 35 connects portions 32 and 33. A bead channel 36 is defined in leg 35 and seat portion 32. A lip 37 at the inner edge of seat portion 32 defines a condensation trough on seat portion 32. A continuous bead of resilient material 38, such as neoprene or silicone rubber, in channel 36 retains a sheet 31 on the frame. A channel 39 is defined by leg 35 and fingers 40 and 41.

A frame 30 is first assembled of lengths of the sections with mitered ends as shown in FIG. 2. A corner reinforcing angle 42 is received in channels 39 at the corners of the joined lengths to rigidize the frame 30, and may be suitably fastened thereto as by crimping or screws.

A frame 30 is then positioned with the channels 36 up. A length of web 31 is stretched or tensioned over the frame, and a continuous length or lengths of bead 38 are inserted into channels 36 to lock the web to the frame. When the collector is assembled to the configuration shown in FIG. 1, a completed frame 30 is positioned on ledge 17 with outer depending flange 34 received in channel 25. Some clearance (see FIG. 4) is provided between flange 34 and wall 15 for reasons hereinafter described.

A frame 30 is positioned in the housing 10 on ledge 17 with flanges 34 extending into channels 25. This locates the frame in the housing. The edge 43 of support portion 33 is dimensioned so that the flange 34 of another frame seats thereon to position a second frame. See FIG. 3. The lips 37 are preferably co-terminus with the lip on trough 16. The edges 43, when the frame is positioned in a housing, are essentially co-terminus with the inner wall 25a of channel 25 and with the inside surface 34a of flange 34. This arrangement and design permits stacking and accurate locating of a plurality of frames 30. The support portion 33 may support either another frame thereon, or one or more glass cover members. With this construction, the frames may be easily installed and removed.

Any number of frame 30 may be stacked depending on the design of the collector housing. Moreover, with the construction disclosed, the frames may be removed to permit any required maintenance or repair in the interior of the housing.

If desired, the ledge 17 may be eliminated, and the frames 30 positioned and located on condensation trough 16, which would then supply a second function as a support ledge. A spacer beneath the first frame could then be provided.

FIG. 4 exemplifies the lower end of a collector housing 10. Interior weep holes 50 are drilled in frames 30, and exterior weep holes 51 are drilled in the bottom of wall 15. Any condensation which forms on the underside of sheet 31 will run down to trough 16 and exit through weep hole 51. Any condensation forming on the underside of sheet 31' will either settle behind lip 37 and/or will pass through weep holes 50 and eventually flow between wall 15 and flange 34 to weep holes 51.

A simulation of a collector as shown in FIG. 1 was tested in Guilford, Connecticut, in January, 1977, on a clear day with an ambient temperature of three to four degrees Fahrenheit. Sheet 31' was spaced from cover member 19 by essentially five-sixteenths inch. Sheet 31 was spaced from sheet 31' by essentially the same difference and essentially one and one-quarter inch above absorber 20.

At a time when the temperature at the absorber was 294° F., the temperature of the air midway between the absorber and sheet 31 was 194° F. The temperature of the air midway between sheets 31 and 31' was 154° F., and the temperature of the air midway between sheet 31' and glass cover member 19 was 111° F.

This layering of air temperature zones substantially reduces the thermal loss due to convective currents. The use of thin layers, as thin as one-thousandth of an inch, gives a substantial savings of both money and weight over glass.

Figure 5:
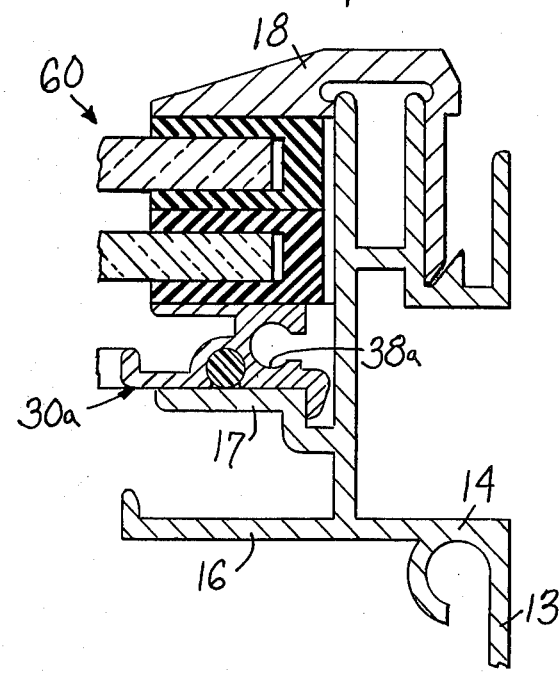
FIG. 5 is a view in section of a portion of a collector housing in an alternate form of the invention.

Even where a double glazed glass cover 60 is utilized as shown in FIG. 5, the invention may be advantageously employed. In FIG. 5, a single frame 30a is utilized. Frame 30a differs from frame 30 only in that annular channels 38a are defined to receive self-tapping screws at the ends thereof to join the lengths together to form a frame.

The invention provides a structure which is easily assembled and/or disassembled, and which permits the creation of one or more air zones or layers between an absorber and the covering glass, while not unduly hindering transmission of light energy to the absorber. Moreover, significant advantage in weight and cost is realized in use of the very thin transparent internal membranes over additional sheets of glass.

It may be thus seen that the objects of the invention set forth as well as those made apparent from the foregoing description are efficiently attained. While preferred embodiments of the invention have been set forth for purposes of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. In a solar energy collector which comprises side and end walls defining a housing, an absorber within said housing, the improvement comprising a support ledge extending inwardly from said wall members above the absorber and below said cover member, a removable rectangular frame member having a thin transparent flexible sheet of material secured thereto and tensioned thereacross, said frame member resting on the support ledge, and cooperating means on said support ledge and said frame member for positioning and retaining said frame member in position on said support ledge.

2. The improvement of claim 1 wherein said cooperating means comprises a channel defined between said ledge and said side walls, and a depending flange on said frame member.

3. The improvement of claim 1 wherein a plurality of said frame members in stacked relation are supported on said ledge, the uppermost of said frames providing a support surface for the cover member.

4. The improvement of claim 3 wherein said frame members have an outwardly positioned depending leg which is positioned at the edge of the support surface of the lower frame member.

5. The improvement of claim 1 wherein each of said frame members includes an inwardly directed condensation gutter.

6. The improvement of claim 1 wherein said frame comprises a lower seating portion having a vertical portion extending to a spaced upper support portion, said upper support portion providing said support, said lower portion defining a channel for a web retaining bead and a retaining bead, said bead locking said sheet material in said channel and across said frame member.

7. The improvement of claim 1 wherein a substantially rectangular channel is defined in said frame members by said seating, vertical support, and support portions, said channels receiving angle members at the corners of said frame.

* * * * *